W. H. JUAN.
LAMP FOR MOTOR VEHICLES.
APPLICATION FILED MAY 7, 1914.
1,116,292.
Patented Nov. 3, 1914.
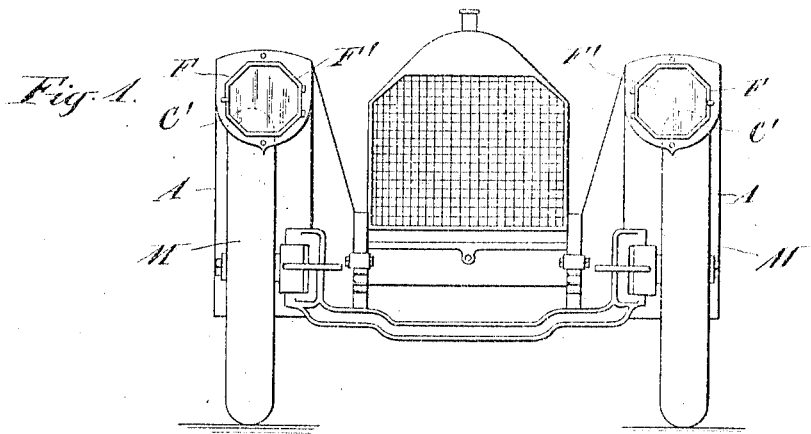
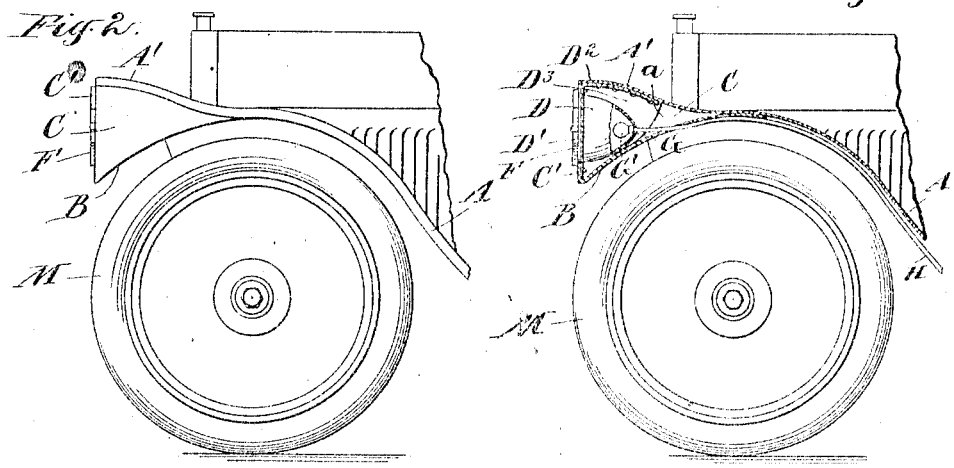
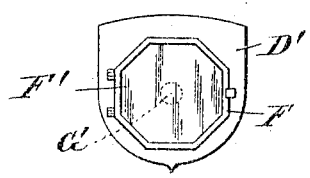  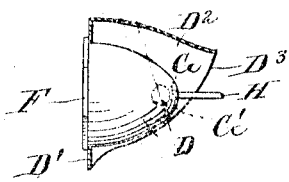
Witnesses:
Inventor:
Walter H. Juan,
by his attorney,
Charles R. Searle

UNITED STATES PATENT OFFICE.

WALTER H. JUAN, OF GREENWICH, CONNECTICUT.

LAMP FOR MOTOR-VEHICLES.

1,116,292.  Specification of Letters Patent.  Patented Nov. 3, 1914.

Application filed May 7, 1914. Serial No. 836,847.

*To all whom it may concern:*

Be it known that I, WALTER H. JUAN, a citizen of the United States, residing at Greenwich, in the county of Fairfield and State of Connecticut, have invented a certain new and useful Improvement in Lamps for Motor-Vehicles, of which the following is a specification.

The invention relates to means for mounting the headlights of automobiles and like vehicles, and the object of the invention is to utilize the mud-guards of the automobile in supporting the lamps, whereby the latter are firmly held and presented in an advantageous position and the employment of special lamp-standards and brackets is avoided.

The invention consists in certain novel features and details of construction and arrangement by which the above objects are attained, to be hereinafter described and claimed.

The accompanying drawings form a part of this specification and show an approved form of the invention.

Figure 1 is a front view of the main portions of an automobile equipped with the invention. Fig. 2 is a corresponding side elevation showing the forward portion of one of the mud-guards and adjacent parts. Fig. 3 is a vertical section taken longitudinally of mud-guard and lamp-body therein, and partly in side view. Fig. 4 is a front view of the lamp-body and its attachments alone. Fig. 5 is a corresponding vertical section, partly in side elevation. Figs. 4 and 5 are on a larger scale than the preceding figures.

Similar letters of reference indicate the same parts in all the figures.

A A are the mud-guards mounted as usual on each side of the automobile; each is a counterpart of the other and a description of one will suffice. The forward end of the plate forming the mud-guard is curved upwardly, as at A¹, from a point above the front wheel M, and a lower plate B is attached thereto at about the same point and bent to follow approximately the periphery of the wheel and extend forwardly thereover on the curve usually employed, or as may be desired, thus forming an angular space between the plates A and B which is closed by side plates C and a front C¹ to form a recess or chamber *a* at the front of the mud-guard.

D is a lamp-body, shown as parabolic and which may be understood to be silvered and polished on the interior surface as usual. It has a radially extending flange D¹ at the front, bent rearwardly at the top as at D² to match to the under face of the extension A¹, and having sides or aprons D³ joining the top and front, as shown. The lamp-body is held in place in the chamber *a* by riveting the flange D¹ to the front C¹ of the mud-guard, and the top D² to the plate A¹ and is thus firmly held and becomes part of the mud-guard. On the front of the flange D¹ is a door-frame F, movably secured by hinges or otherwise, carrying a glass plate F¹ closing the mouth of the lamp-body and matching to and received in an opening provided for the purpose in the front plate C¹ of the mud-guard. The lamp-body is equipped on its interior with a lamp-socket G adapted to receive an incandescent lamp G¹, and connected by suitable wires, not shown, inclosed in a tube H, to a battery or other source of current. The tube H lies immediately beneath and is concealed by the mud-guard. Thus arranged the lamps are efficiently supported and protected, and throw their beams of light from widely separated points on the car, which is an advantage to the driver in affording better illumination over a wider area of roadway and of still greater importance to the driver of an approaching car in that the lamps indicate practically the full width of the car and danger of side-wiping collisions is thereby greatly lessened.

As will be readily understood upon reference to Figs. 2 and 3, the lamps are disposed in an extreme forward location so as to permit the engine hood to be raised and work to be done on the engine without having to reach over the lamp and without danger of breaking the latter.

The improved arrangement presents a neat and attractive appearance, and the employment of the usual lamp-standards and brackets is avoided.

I claim:—

1. In a motor vehicle, a mud guard extended over and in front of the front wheel, a lower plate secured to the mud guard and curved downwardly, side and front plates secured to said mud guard and lower plate and forming a chamber beneath the mud guard, and a lamp body within said chamber and having flanges secured to said mud guard and plate, said lamp body being disposed forward of the engine hood.

2. In a motor vehicle, a mud guard extended over and in front of the front wheel, a lower plate secured to the mud guard and curved downwardly, side and front plates secured to said mud guard and lower plate and forming a chamber beneath the mud guard, and a lamp body within said chamber and having flanges radially extended and rearwardly bent and secured to said mud guard and plate, said lamp body being disposed forward of the engine hood, the lower plate being provided with an opening for the passage of a tube containing wires for the lamp.

In testimony that I claim the invention above set forth I affix my signature, in presence of two witnesses.

WALTER H. JUAN.

Witnesses:
CHARLES R. SEARLE,
HELEN V. RICE.